Figure 1:
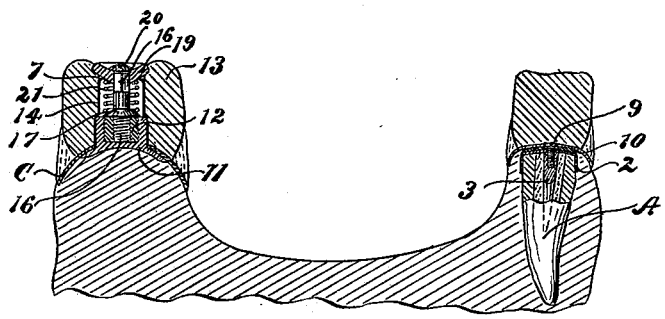

No. 672,163. Patented Apr. 16, 1901.
A. C. CALDWELL.
REMOVABLE DENTURE.
(Application filed Aug. 9, 1900.)

(No Model.) 3 Sheets—Sheet 1.

Witnesses
A. H. Opsahl.
Elgie H Evans

Inventor.
Alonzo C Caldwell
By his Attorneys
Merwin, Lothrop & Johnson

No. 672,163. Patented Apr. 16, 1901.
A. C. CALDWELL.
REMOVABLE DENTURE.
(Application filed Aug. 9, 1900.)
(No Model.) 3 Sheets—Sheet 2.
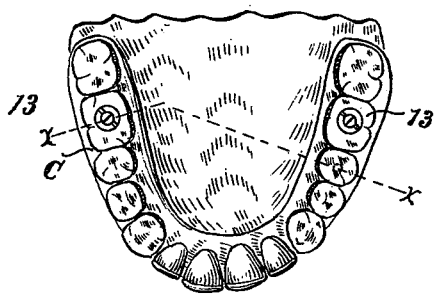
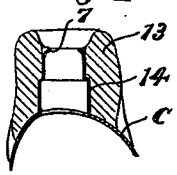
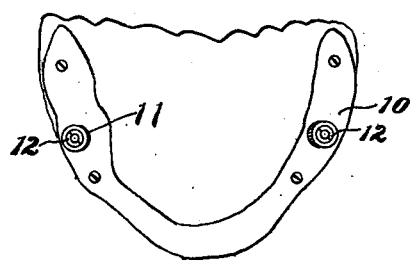
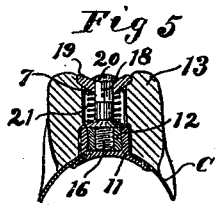
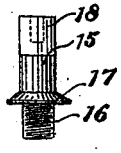
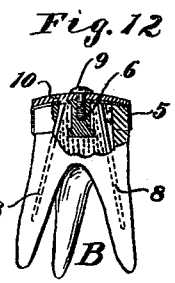
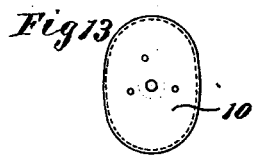
Witnesses
A. H. Opsahl
Elgie H. Evans
Inventor:
Alonzo C. Caldwell
by his Attorneys
Marvin, Lothrop & Johnson No. 672,163. Patented Apr. 16, 1901.
A. C. CALDWELL.
REMOVABLE DENTURE.
(Application filed Aug. 9, 1900.)
(No Model.) 3 Sheets—Sheet 3.
Fig. 14
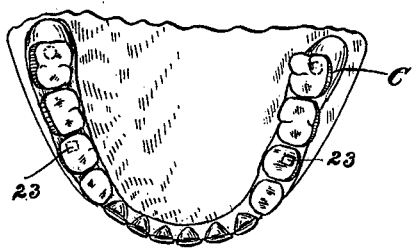
Fig. 15
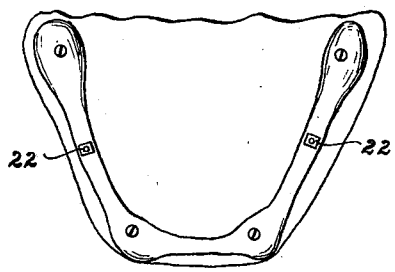
Fig. 16
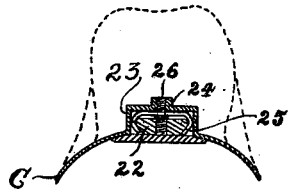
Fig. 17
Fig. 18
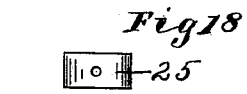
Witnesses
A. H. Opsahl.
Elgie H. Evans
Inventor.
Alonzo C. Caldwell
By his Attorneys
Merwin, Lothrop & Johnson
THE NORRIS PETERS CO., PHOTO-LITHO., WASHINGTON, D. C.

UNITED STATES PATENT OFFICE.

ALONZO C. CALDWELL, OF ST. PAUL, MINNESOTA.

REMOVABLE DENTURE.

SPECIFICATION forming part of Letters Patent No. 672,163, dated April 16, 1901.

Application filed August 9, 1900. Serial No. 26,324. (No model.)

*To all whom it may concern:*

Be it known that I, ALONZO C. CALDWELL, a citizen of the United States, residing at St. Paul, in the county of Ramsey and State of Minnesota, have invented certain new and useful Improvements in Removable Dentures, of which the following is a specification.

My invention relates to improvements in dentistry, its object being particularly to provide improvements in that class of dentures which are removably supported in the mouth upon a series of anchors.

To this end my invention consists in the construction and combination hereinafter particularly described and claimed.

In the accompanying drawings, forming part of this specification, Figure 1 is a cross-section of an upper maxillary, showing my removable denture in place, taken on line $xx$ of Fig. 2. Fig. 2 is a plan view of the maxillary and denture. Fig. 3 is a similar view showing the saddle-plate, the tooth-carrying plate being removed. Fig. 4 is a cross-section of one of the teeth. Fig. 5 is a similar view showing the devices for securing the tooth-carrying plate to the anchor-plate. Figs. 6, 7, 8, and 9 are details of said devices. Figs. 10 and 11 are side elevations, partly broken away, and top elevations of a premolar root fitted to serve as an anchor. Figs. 12 and 13 are similar views of a molar root fitted to serve as an anchor. Fig. 14 is a plan view of a modified construction shown in place upon lower maxillary. Fig. 15 is a similar view showing the saddle-plate in position and the denture removed. Fig. 16 is a vertical section of a tooth and connected parts, showing the modified form of connection between tooth-carrying plate and saddle-plate; and Figs. 17 and 18 are details of a spring used in the form of connection shown in Fig. 16.

In the drawings, A and B represent the roots of premolar and molar teeth, which constitute the anchors for the removable denture. Any desired number of roots may be used for this purpose, and they may be the natural, transplanted, or implanted roots. The top of the premolar root A, as shown, is covered by a metal cap 2, carrying a post 3, which projects into the cavity of the root and is secured therein in suitable manner. The top of the molar root B is covered by a similar cap 5, carrying a post 6, embedded in the root. Rods 8 also preferably run from the cap into the different prongs of the root. A metal saddle 10 is secured to the root-anchors A and B by means of screws 9, passing into the posts in the roots. To this saddle 10 the removable denture is secured in the following-described manner: Mounted upon the saddle 10 are interiorly-threaded lugs 11, within which are threaded the plugs 12, said plugs being each formed with a central threaded opening. C represents a base-plate shaped to fit over the saddle 10, said base-plate supporting a series of teeth. One of the teeth 13 is formed with a central opening, as shown in Fig. 4, in which is fitted a lining 14, an opening being formed in the base-plate C, registering with the opening of the tooth. A post 15, as shown in Fig. 6, is arranged in the opening of said tooth and has its lower end 16 threaded to fit in the opening in the plug 12. The post above the threads is formed with a flange 17, which fits over the top of the plug 12 and the lug 11 when the parts are in place, as shown in Fig. 5. The top of the post 18 is square and receives a nut 19, the nut being held in place by a screw 20, passing into the top of the post, the outer edge of the nut bearing upon the edge of the concavity in the top of the tooth. A spring 21 is interposed between the flange 17 and a flange 7, projecting inwardly from the top of the lining 14. When the parts are thus secured together, the lug 11 and plug 12 stand in the lower part of the opening of the tooth, causing the base-plate C to set closely upon the saddle and cover the same.

In the use of the invention the anchor-roots are first prepared in the manner shown in Figs. 10 and 12. The saddle 10 is then secured to the roots, as shown in Fig. 3. The tooth-supporting base-plate is then placed over the saddle-plate and the post 15 screwed into the plugs 12, carried by the saddle-plate, thus firmly securing the tooth-carrying plate and saddle-plate together. It will be understood that a suitable composition, as indicated in Fig. 5, will be arranged in connection with the teeth upon the base-plate to cause the denture to correspond in appearance with the natural teeth and gums. In removing the teeth and their plate from the saddle-plate all that will be necessary to do is to turn the nut 19, which turns the post 15 and separates it from the plug 12, when the tooth-carrying plate can be lifted and removed.

In Figs. 14 to 18 is represented a modified construction. In this construction the saddle-plate is secured to the anchors the same as in the preferred construction, and upon the saddle are secured nuts 22. In each of those teeth which are adapted to stand above the nuts 22 is a rectangular socket 23, having a central threaded neck 24. Mounted in said socket is a spring 25, secured therein by a screw 26, passing into the neck 34. The ends of said spring fit over the sides of the nut 22, as shown in Fig. 16, thus holding the tooth-carrying plate and the anchor-plate together by spring-pressure. The sides of the nuts are preferably convexed, so as to allow the ends of the springs to slip thereover and to conform thereto.

The advantages of my construction will be apparent. If the natural roots in the mouth are in proper position, they can be used to support the saddle-plate, or transplanted or implanted anchors can be properly placed. The saddle combines the strength of the utilized anchors, furnishing a firm support for the finished product. The forms of connection shown between the finished product and saddle permit easy removal of the finished product, render same sanitary, allow of easy repairing, and hold the finished product firmly upon saddle.

It will be evident that the construction shown in the drawings may be modified without departing from the invention, the scope of which is defined by the claims.

I claim—

1. In a denture of the class described, the combination of a saddle shaped to conform to the gums, means for anchoring the same in the mouth, a finished product consisting of a plate supporting a series of teeth, and means arranged in one or more of said teeth for removably securing said finished product to the saddle.

2. In a denture of the class described, the combination of a series of anchor-roots arranged in the mouth, a saddle arranged over the tops thereof and secured thereto, said saddle conforming to the gums, a tooth-carrying plate, and a series of teeth mounted upon said plate, certain of said teeth being provided with cavities registering with openings in the plate, and means arranged in said cavities and connected with the saddle to secure the tooth-carrying plate thereon.

3. In a denture of the class described, the combination of a series of anchor-roots arranged in the mouth, a finished product consisting of a series of teeth secured together, and means for detachably securing said finished product to said anchors, consisting of lugs supported by the anchors, and posts arranged in cavities in certain of the teeth and adapted to project into removable plugs arranged in said lugs.

4. In a denture of the class described, the combination of a series of anchor-roots arranged in the mouth, a finished product consisting of a series of teeth secured together, and means for detachably securing said finished product to said anchors, consisting of lugs supported by said anchors, screw-threaded posts arranged in cavities in certain of said teeth, and threaded into said lugs, and removable nuts carried by said posts and engaging said teeth.

5. In a denture of the class described, the combination of a saddle, suitably anchored in the mouth, a tooth-carrying plate a series of teeth supported thereon, certain of said teeth being each formed with a cavity registering with an opening in the plate, a lug carried by the saddle and adapted to project into said cavity, and a post arranged in said cavity and adapted to be threaded into said lug, oppositely-arranged flanges upon said post and the wall of said cavity, a spring arranged intermediate of said flanges, and a nut carried by said post and engaging with the tooth.

6. In a denture of the class described, the combination of a saddle suitably anchored in the mouth, a tooth-carrying plate, a series of teeth supported thereon, certain of said teeth being formed with cavities registering with openings in the plate, lugs carried by the saddle and adapted to project into said cavities, screws arranged in said cavities and threaded in said lugs, and springs surrounding said screws.

In testimony whereof I affix my signature in presence of two witnesses.

ALONZO C. CALDWELL.

Witnesses:
H. S. JOHNSON,
ELGIE H. EVANS.